April 24, 1962 E. E. MALLORY 3,031,353
BEAD STITCHING DEVICE FOR TIRE BUILDING MACHINE
Filed Nov. 28, 1958 3 Sheets-Sheet 2

INVENTOR.
EDWIN E. MALLORY
BY
Oberlin, Maky, & Donnelly
ATTORNEYS

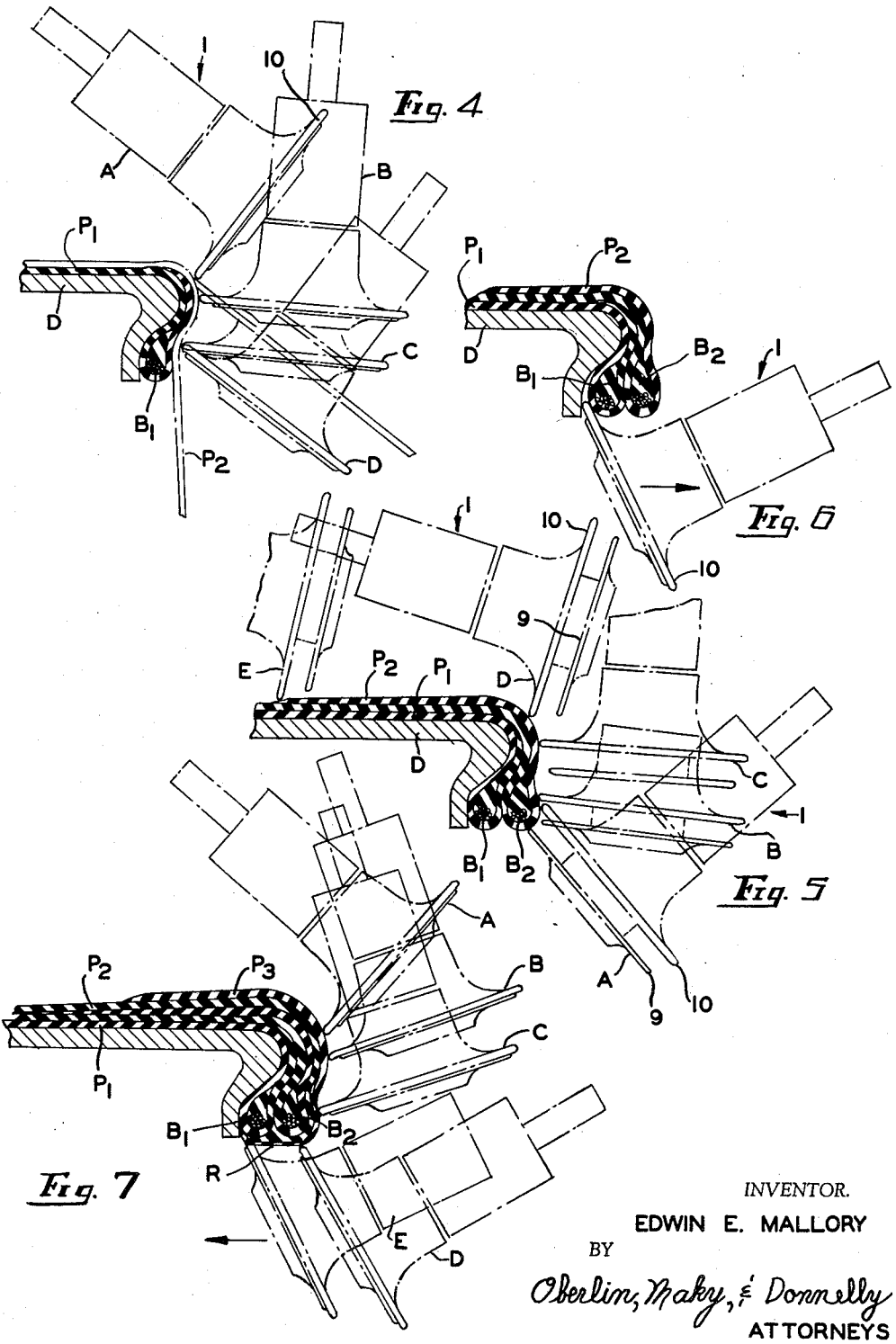

United States Patent Office 3,031,353
Patented Apr. 24, 1962

3,031,353
BEAD STITCHING DEVICE FOR TIRE
BUILDING MACHINE
Edwin E. Mallory, Cuyahoga Falls, Ohio, assignor to National Rubber Machinery Company, Akron, Ohio, a corporation of Ohio
Filed Nov. 28, 1958, Ser. No. 776,868
6 Claims. (Cl. 156—402)

This invention relates generally as indicated to a bead stitching device for a tire building machine and more particularly to a bead stitcher operative to fold and compact tire fabric around the beads of, for example, a dual bead undercut or shoulder built tire, and to strip such beads from the undercut ends of the tire building drum.

The bead stitcher herein is adapted for use as one of several tools or components of a tire building machine of the type which utilizes a radially collapsible rotary tire building drum around which tire fabric such as ply stock is wrapped and has its overhanging ends folded in against the drum shoulders and thence folded out and around beads placed against the folded-in stock. Such carcass after completion on such machine is removed from the collapsed drum and is transported to a tire vulcanizer that is operative in well-known manner to deform the carcass to tire shape and to vulcanize the thus-shaped carcass.

As before-mentioned, the present bead stitcher has particular utility in the making of a so-called "undercut-built" or "shoulder-built," heavy duty truck or bus tire carcass which is characterized by the provision of dual beads at each end of the carcass located radially inward a substantial distance from the main cylinder body or tread portion and also located axially inward of the shoulders or crowned end portions of the collapsible tire building drum, so as to reduce the relative amount of deformation of said tread portion with respect to the beads during the shaping and vulcanizing operations as compared with, for example, the deformation encountered with a passenger car tire carcass in which the single beads at each end are of substantially the same diameter as the main body of the carcass.

A prevalent practice in the art of making such shoulder-built tire carcass on a tire building drum is to wrap the ply stock around the drum with the edge portions overhanging the drum shoulders. A subsequent operation involves the turning in of each overhanging portion of the plies against the adjacent drum shoulder followed by placement of a bead against the turned-in stock, whereafter suitable rings or the like are pulled out from within the drum to press the stock against the inside diameter of the respective beads.

The plies are then flared outwardly around the beads and are stitched to the inturned portions of the plies. The foregoing operations are then repeated for wrapping plies around another set of beads. Finally, after these and other operations are performed the tread and side wall stock are applied and stitched onto the last applied ply. The carcass thus built is axially removed from the drum after collapsing the latter.

It is a principal object of this invention to provide a bead stitching device which is operative to uniformly fold and to compress tire fabric around the beads of a tire carcass, and particularly, of a dual-bead tire carcass.

It is another object of this invention to provide a bead stitching device of the character indicated which is further operative to strip the bead portions of the carcass from the shoulders or ends of the tire building drum.

It is another object of this invention to provide a bead stitching device of the character indicated which, at certain stages of its operation upon the tire fabric, provides a plurality of spaced-apart stitching discs for simultaneously uniformly compressing and folding different portions of the bead operated upon thereby.

It is yet another object of this invention to provide a multi-disc stitching device in which the discs are separately journalled for rotation at different peripheral speeds in accordance with the different diameters of the tire fabric simultaneously engaged thereby as the drum rotates about its central axis; or, stated in other words, the stitching discs are driven by the rotary drum at peripheral speeds depending upon the diameters of the portions of the tire fabric frictionally engaged by the respective stitching discs.

It is yet another object of this invention to provide a bead stitching device which has a plurality of stitching discs arranged to compress and fold different portions of the tire fabric around a bead, the discs being relatively movable to a nested condition whereat, in effect, a single thin disc remains which may be inserted between the end of the tire building drum and the bead portion of the carcass for stripping the bead portion from the end of the tire building drum. The single disc may also be used to perform various other tire building operations, such as ply turn-down, ply turn-up, tread stitching, etc.

It is yet another object of this invention to provide a multi-disc bead stitching device which provides a plurality of circular ribs or ridges, that are axially spaced apart during certain operations so as to straddle the bead and thereby guide the device around its rotational center, this enabling the application of higher stitching pressures than would be permissible with a single disc device. Moreover, the plurality of stitching discs serve to straddle the bead portion of the tire carcass so as to prevent slipping off to one side or the other thereof as often occurs when a single disc stitcher is used.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principle of the invention may be employed.

In said annexed drawings:

FIGS. 4 to 7 are diagrammatic views showing the series of movements of the instant bead stitching device in the performance of different ones of its several functions.

Figure 1:
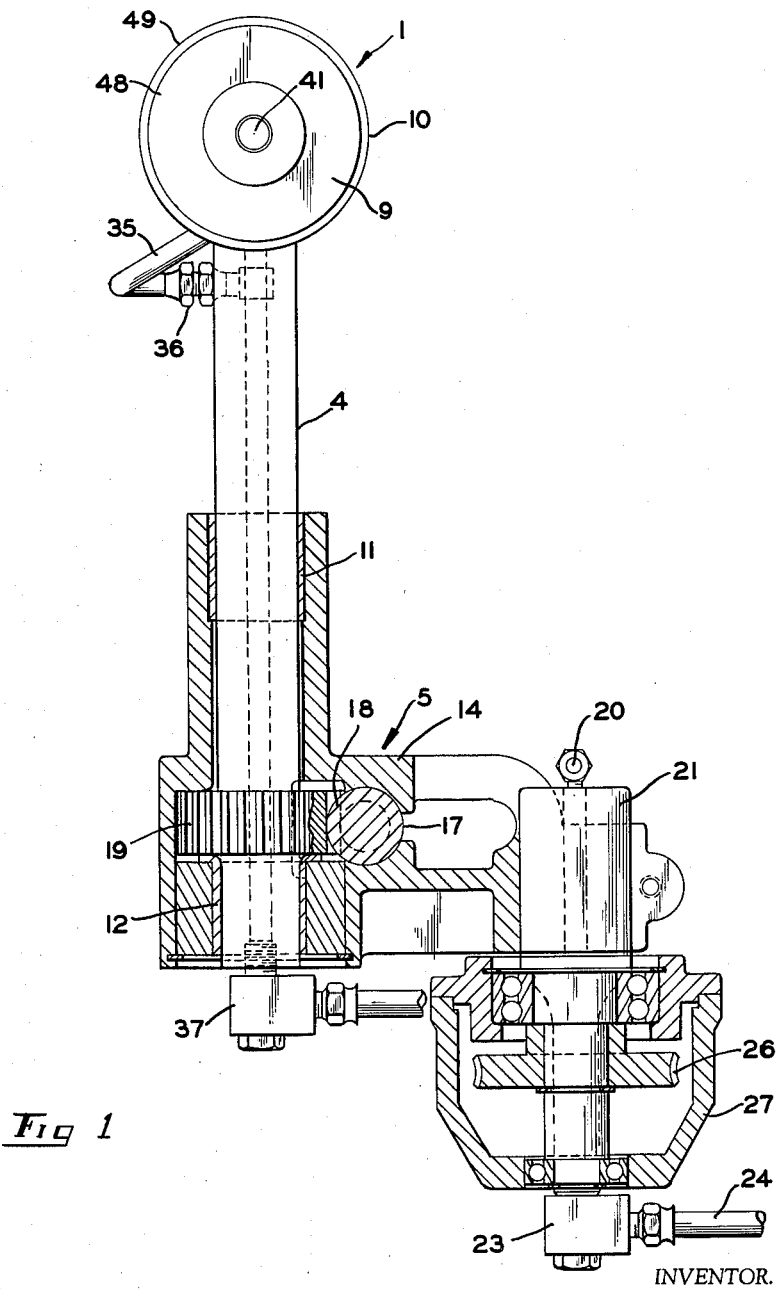
FIG. 1 is a central vertical cross-section view taken substantially along the line 1—1, FIG. 2, showing one of a pair of stitcher manipulating heads on which the instant bead stitching device is mounted.
Figure 3:
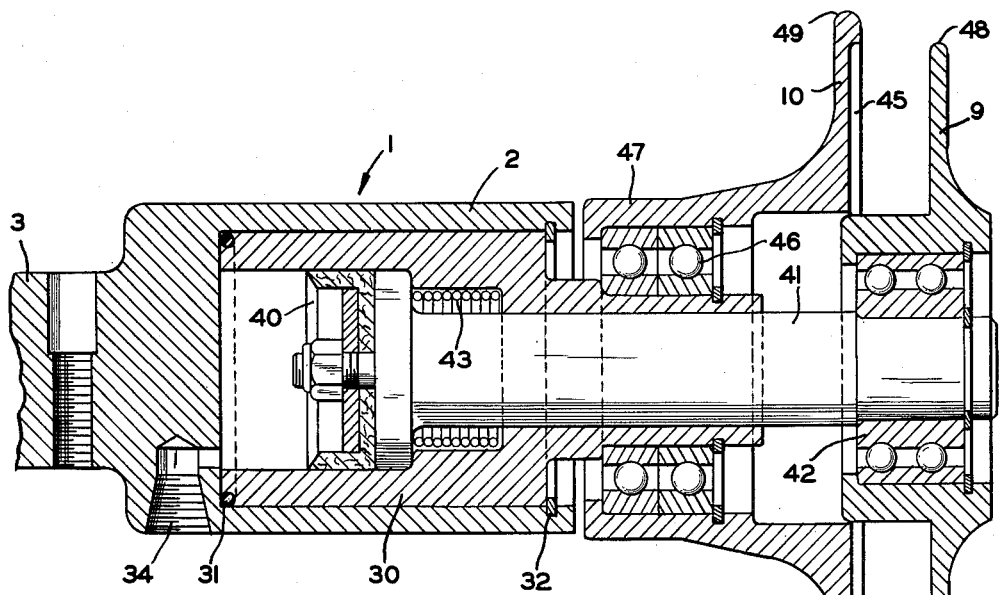
FIG. 3 is a central longitudinal cross-section view taken substantially along the line 3—3, FIG. 2, showing a preferred form of the bead stitching device constituting the present invention.
Figure 2:
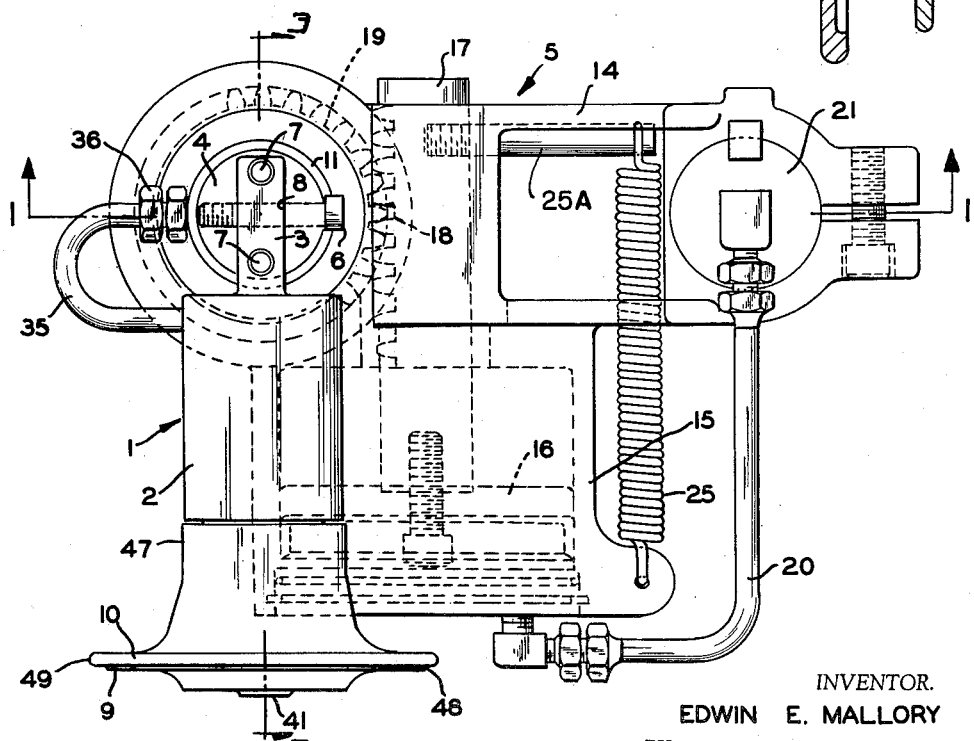
FIG. 2 is a top plan view (on somewhat enlarged scale) as viewed from the top of FIG. 1, and showing a preferred form of bead stitching device mounted in generally horizontally extending position at the top of the manipulating apparatus.

Referring now more particularly to the drawings, and first to FIGS. 1, 2 and 3, the bead stitching device or tool is generally denoted by the reference numeral 1 and, as shown, the body 2 thereof may be provided with a tang 3 which fits in the bifurcated upper end of a rotatably mounted shaft 4 of the stitching tool manipulating head or mechanism 5. The tang 3 is pivotally mounted on the screw 6, and preferably setscrews 7 threaded into the tang 3 bear on the bottom of the slot 8 of the shaft 4 on either side of the pivot provided by screw 6, whereby the stitching tool 1 may be swung up or down about the axis of the screw 6 so as to properly position the peripheries of the stitching discs 9 and 10 with respect to the periphery of the tire building drum D.

Before describing in detail the construction of the bead stitching tool 1 herein, reference will be first made to the manipulating mechanism 5 which, as aforesaid, includes the shaft 4 that carries the stitching tool and which is mounted for rotation in the bushings 11 and 12 of a housing 14. Rotation of the shaft 4 about its central longitudinal axis is effected as by means of a pneumatic cylinder 15 having an air pressure actuated piston 16 therein, the piston rod 17 being formed with a gear rack 18 which meshes with a gear 19 keyed onto the lower end portion of the shaft 4. Air under pressure is supplied to move said piston 16 upwardly, as viewed in FIG. 2, by way of the conduit 20 and by way of the hollow shaft 21 and the rotary joint 23 secured at the lower end of said shaft 21. The flexible air inlet line 24 leads to an air pressure supply source and there will be included in the line 24 a suitable control valve (not shown) selectively operative to supply air at desired pressure into the cylinder 15 or to vent the cylinder 15 according to the particular operations which are being performed by the stitching tool 1. When cylinder 15 is vented, a tension spring 25 connected to piston rod 17 by means of a dowel pin 25A threaded therein will be effective to return the piston 16 to its original position.

The housing 14 aforesaid, is slit at one end, as shown, and is keyed to and clamped onto the upper end of the shaft 21 aforesaid. The last-mentioned shaft 21 has a worm wheel 26 keyed thereon and disposed in another housing 27 and obviously, when a worm (not shown) in mesh with said worm wheel 26, is rotated in one direction or the other, the shaft 21 will be rotated about its central longitudinal axis to thus swing the stitcher shaft 4. The worm wheel 26 may be driven by a worm as disclosed for example, in the patents to F. J. Shook et al. Pat. No. 2,488,340, E. E. Mallory et al. Pat No. 2,529,509, and E. E. Mallory Pat. No. 2,544,390. Reference may also be had to the Bruce W. Ewing et al. copending application Ser. No. 655,754, filed April 29, 1957.

It is to be understood that the housing portion 27 of the stitching tool manipulating mechanism 5 will be mounted for bodily movement so as to position the stitching tool 1 radially closer to, or farther away from, the tire building drum D to accommodate different diameters of drums D and so as to move the stitching tool 1 parallel to the axis of the drum D.

As best shown in FIG. 3, the bead stitching tool 1 herein has a cylinder 30 mounted in the body 2 which is sealed therein as by means of the O-ring 31 and is held therein as by the snap ring 32. Leading through said body 2 into said cylinder 30 is a passage 34 through which air or other fluid under pressure is supplied as by way of the conduit 35 which leads to a fitting 36 screwed into the hollow tubular stitching tool carrying shaft 4. As in connection with the other hollow shaft 21, the tool carrying shaft 4 has a rotary joint 37 at its lower end to which the air supply line is connected, and again a control valve (not shown) will be connected in said air supply line so that the cylinder 30 may be supplied with air under pressure or may be vented, as desired.

Reciprocable in said cylinder 30 is a piston 40 having its piston rod 41 extending axially through the cylinder and journalling the smaller stitching disc 9 thereon through anti-friction bearings 42. A coil spring 43 is compressed between the piston 40 and the cylinder 30, said spring being effective to normally urge the stitching disc 9 into nested relation within the recess 45 provided in the larger stitching disc 10 when the air pressure in the cylinder 30 is vented. The larger stitching disc 10 is journalled on the reduced end portion of the cylinder 30 through anti-friction bearings 46 and the hub 47 thereof is preferably of approximately the same diameter as, and closely adjacent to, one end of the body 2.

When air under pressure is admitted into the cylinder 30, the piston 40 is moved to the position shown, whereby the periphery of the fabric-engaging rib 48 of the stitching disc 9 is axially spaced with respect to the periphery of the fabric-engaging rib 49 of the larger stitching disc 10.

In order that the mode of operation and features of the present bead stitching tool 1 may be more readily comprehended, reference will now be made to FIGS. 4 to 7 which illustrate schematically the successive movements of the stitching tool 1 during the performance of certain tire building operations.

In general, the building of a dual-bead tire such as a 10.00 x 20 truck or bus tire on the drum D may involve the following steps:

(1) The first ply group (comprising four plies of tire fabric, for example) is wrapped around the drum D and said plies may be stitched together by engaging the stitching disc 10 therewith while said disc is moved axially toward an end of the drum;

(2) The overhanging ends of the first ply group are then turned over the drum shoulders, again by appropriate manipulation of a stitcher disc 10 or the like;

(3) A bead is pressed against the inturned plies;

(4) The first ply group is then pressed against the inside of the bead and flared out and pressed against the outside of the bead;

(5) The second ply group, say of four more plies, is then applied around the drum D and stitched and turned in as described in steps (1) and (2) above;

(6) A second bead is then pressed against the inturned second ply group;

(7) The second ply group is then worked as described in step (4) to encompass the second bead;

(8) The final ply group, of two plies, for example, are then applied to the drum D and also the tread and sidewall stock followed by stitching with a stitching disc;

(9) The overhanging stock is then turned down as before and the woven fabric rim chafing strip is stitched around the beads and tucked in between the first bead and the end of the drum D;

(10) At this stage the dual beads may be stripped from the drum shoulders and the drum collapsed for removal of the carcass therefrom.

In FIG. 4 there is shown a fragmentary section of one end of the tire building drum D which has already had the first ply group P1 turned in, or turned down, the first bead B1 stuck to the turned-down ply P1, and the first ply P1 turned out, and stitched against the bead B1. Now, in applying the second ply group P2 and with the cylinder 30 vented so that the smaller stitching disc 9 is nested in the larger stitching disc 10 the stitching tool 1 is pressed into engagement with the second ply P2 at the position A. Air pressure in the cylinder 15 is at this time effective to constantly tend to rotate the tool carrying shaft 4 about its axis to thereby yieldably press the periphery of the stitching disc 10 against the ply stock. At the same time, the shaft 21 is turned about its axis to swing the stitching tool 1 through the successive positions B, C, and D, about an axis which approximately passes through the center of the radius at the end of the drum D.

After the FIG. 4 operation has been completed by the application of the second bead B2 against the turned-down second ply P2, the inner portion of said ply P2 will be pressed against the inside diameter of the second bead B2 in the manner described in detail in the aforesaid Ewing et al. application Ser. No. 655,754, or as hereinbefore described.

At this time, air pressure is admitted into the stitching tool cylinder 30 to move the smaller stitching disc 9 out of nested relation with the larger stitching disc 10, whereby as shown in FIG. 5 as the stitching tool 1 is swung through the positions A, B, C, D and E the two discs 9 and 10 will contact different portions of the second ply P2 which is being turned out and stitched against the second bead B2. By reason of the journalling of the two discs 9 and 10 for independent rotation, the discs 9 and 10 will be driven at different peripheral speeds without slippage or rubbing contact with the ply stock P2 and, furthermore, by reason of the axial spacing of the peripheries of the stitching discs 9 and 10, as shown, the same straddle the bead assembly worked upon thereby to eliminate slippage and, of course, much higher folding and compressing pressures may be employed to firmly stitch the plies to the beads B1 and B2 and their flipper strips. If desired, at this stage of the operation the air pressure in the cylinder 15 may be increased so as to press the discs 9 and 10 with greater force against the ply stock.

Although in FIG. 4 the stitching tool 1 is shown as turning the second ply P2 down, the stitching tool 1 will, of course, be used for turning down the first ply P1 and the tool will have the same relative motions A, B, C, and D, as shown in FIG. 4. Likewise, as to FIG. 5, the double disc folding and compressing of the first ply P1 around the first bead B1 may be effected by the same motions as depicted by A to E in FIG. 5.

One of the last operations in the building of the tire carcass is the final turn-down and tuck-under, this preferably being accomplished with the cylinder 30 vented so that the smaller disc 9 is nested in the larger disc 10, and in this case the stitching tool 1 progressively moves through the positions A, B, C, D and E, to firmly and uniformly turn down and stitch the final ply P3 and to tuck the rim chafing strip R between the drum D and the first bead. When the stitching disc 10 presses the strip R against the inside diameters of the beads from the position D to the position E in FIG. 7, the tool manipulating mechanism 5 as a whole will be shifted axially of the drum D as represented by the arrow in FIG. 7.

After the turn-out operation of FIG. 5, it has been found desirable to pull the bead of the carcass away from the end of the drum D. This may be accomplished by placing the tool 1 so that the larger stitching disc 10 enters between the first bead and the drum D, whereupon the manipulating mechanism 5 may be shifted outwardly in an axial direction, as represented by the arrow in FIG. 6, to free the bond between the first bead and the end of the drum D.

Then follows the FIG. 7 operation for tucking the woven fabric rim chafing strip, as represented by position E in FIG. 7, and thereafter air pressure may be admitted into the cylinder 30 to bring the smaller stitching disc 9 out into axially spaced relation with respect to the larger disc 10, whereupon both discs 9 and 10 will simultaneously operate on different portions of the bead as the stitching tool 1 is shifted in the reverse direction, that is, from position E to D, D to C, C to B, B to A, to effect a final high pressure uniform stitching of the bead and with increased pressure as may be obtained by supplying higher pressure air into the cylinder 15.

Other modes of applying the principle of the invention may be employed, change being made as regards the details described, provided the features stated in any of the following claims, or the equivalent of such, be employed.

I therefore particularly point out and distinctly claim as my invention:

1. A stitching device for a tire building machine of the type having a rotary drum, said device comprising a body, at least two axially spaced apart stitching discs mounted on said body for independent rotation with respect to said body, manipulating means connected to said body effective to turn said body about a first axis to press the peripheries of said discs against different portions of tire fabric wrapped around the drum and about a second axis to stitch the fabric around a tire bead, and means supporting said discs for relative axial movement to render but one of them effective to engage the fabric during certain tire building operations or to be inserted between the end of the drum and the carcass bead to strip the latter from the end of the drum.

2. The stitching device of claim 1 wherein said discs are of different diameters, wherein the larger disc has a recess for reception of the smaller disc, and wherein means are provided on said body to relatively axially move said discs to a position wherein the smaller disc is nested peripherally within the recess of the larger disc.

3. The stitching device of claim 2 wherein said last-named means is a fluid power means operative also to move said discs axially relative to one another from nested to axially spaced relation.

4. A stitching device for a tire building machine of the type having a rotary drum, said device being mounted for movement about an end of such drum frictionally to engage the overhanging end of tire fabric wrapped around the drum to turn down the fabric over the end of the drum and to turn up the fabric over a bead placed on the turned down portion, said device comprising a piston-cylinder assembly, and a pair of circular fabric engaging discs rotatably mounted on the piston and cylinder respectively of said piston-cylinder assembly, the movement of said piston within said cylinder thus moving said discs axially relative to one another selectively to render one or both said discs effective to engage such tire fabric.

5. A stitching device as set forth in claim 4 wherein said circular discs are of different diameter, the larger of said discs being formed with a recess to receive the smaller of said discs peripherally therewithin.

6. A stitching device for a tire building machine of the type having a rotary drum, said device being mounted for movement about an end of such drum frictionally to engage the overhanging end of tire fabric wrapped around the drum to turn down the fabric over the end of the drum and to turn up the fabric over a bead placed on the turned down portion, said device comprising at least two circular fabric engaging discs rotatably independently mounted, one of said discs having a recess therein adapted peripherally to enclose the other of said discs, and power means operative relatively to move said discs selectively axially to enclose one peripherally within the other.

References Cited in the file of this patent

UNITED STATES PATENTS

| | | |
|---|---|---|
| 1,255,073 | Abbott | Jan. 29, 1918 |
| 1,310,236 | Gammeter | July 15, 1919 |
| 1,465,552 | Holmes | Aug. 21, 1923 |
| 1,613,519 | Macbeth | Jan. 4, 1927 |
| 1,657,846 | Stevens | Jan. 31, 1928 |
| 2,373,354 | Sternad | Apr. 10, 1945 |
| 2,541,648 | Haase | Feb. 13, 1951 |
| 2,642,921 | Appleby | June 23, 1953 |
| 2,649,892 | Appleby | Aug. 25, 1953 |
| 2,699,198 | Balzhiser | Jan. 11, 1955 |
| 2,747,650 | Haase | May 29, 1956 |